(12) United States Patent
Miyagawa et al.

(10) Patent No.: US 7,088,954 B2
(45) Date of Patent: Aug. 8, 2006

(54) WIRELESS COMMUNICATION DEVICE

(75) Inventors: Tai Miyagawa, Higashihiroshima (JP);
Kaoru Okabe, Higashihiroshima (JP);
Tetsuo Onodera, Kashiwa (JP)

(73) Assignee: Sharp Kabushiki Kaisha, Osaka (JP)

( * ) Notice: Subject to any disclaimer, the term of this patent is extended or adjusted under 35 U.S.C. 154(b) by 529 days.

(21) Appl. No.: 10/240,196

(22) PCT Filed: Mar. 30, 2001

(86) PCT No.: PCT/JP01/02800

§ 371 (c)(1),
(2), (4) Date: Sep. 30, 2002

(87) PCT Pub. No.: WO01/73963

PCT Pub. Date: Oct. 4, 2001

(65) Prior Publication Data

US 2003/0143970 A1 Jul. 31, 2003

(30) Foreign Application Priority Data

Mar. 30, 2000 (JP) .......................... 2000-94223

(51) Int. Cl.
*H04B 1/10* (2006.01)
*H04B 15/00* (2006.01)

(52) U.S. Cl. .................. 455/63.1; 455/63.1; 455/67.13; 455/295; 455/114.2; 455/296

(58) Field of Classification Search ................ 455/63.1, 455/67.13, 114.2, 295, 296, 78, 83
See application file for complete search history.

(56) References Cited

U.S. PATENT DOCUMENTS

| | | | | |
|---|---|---|---|---|
| 5,630,223 A | * | 5/1997 | Bahu et al. .................. | 455/296 |
| 5,761,614 A | * | 6/1998 | Leitch et al. ................ | 455/254 |
| 6,176,432 B1 | | 1/2001 | Miyaura ...................... | 235/487 |
| 6,459,915 B1 | | 10/2002 | Nakamura et al. .......... | 455/571 |
| 6,714,775 B1 | * | 3/2004 | Miller ......................... | 455/296 |
| 2004/0224657 A1 | * | 11/2004 | Matsusaka ................ | 455/278.1 |

FOREIGN PATENT DOCUMENTS

| | | |
|---|---|---|
| JP | 51-10706 | 1/1976 |
| JP | 51-10706 A | 1/1976 |
| JP | 60-214123 A | 10/1985 |
| JP | 63-111037 U | 7/1988 |
| JP | 63-111037 A | 7/1988 |
| JP | 4-208723 A | 7/1992 |
| JP | 6-37668 A | 2/1994 |
| JP | 6-104790 A | 4/1994 |
| JP | 9-46764 A | 2/1997 |
| JP | 11-186932 A | 7/1999 |
| JP | 11-261434 A | 9/1999 |
| JP | 2000-349508 A | 12/2000 |
| JP | 2001-24476 A | 1/2001 |

OTHER PUBLICATIONS

Japanese Office Action mailed Jan. 27, 2004 in corresponding Japanese application No. 2000-094223.
International Preliminary Examination Report mailed Nov. 28, 2002 in corresponding PCT application No. PCT/JP/01/02800.

* cited by examiner

*Primary Examiner*—Simon Nguyen
(74) *Attorney, Agent, or Firm*—Nixon & Vanderhye

(57) ABSTRACT

A wireless communication apparatus of the present invention has an interference signal cutoff circuit (10) for cutting off electric waves having interference frequencies of $\Delta f=|frx \pm ftx|$ interposed between a receiving antenna (1) and a receiver (5). A transmitter (6) is connected to a transmitting antenna (11).

In this way, provision of the interference signal cutoff circuit (10) makes it possible to prevent degradation of reception characteristics, the degradation being caused such that the transmission wave radiated from the transmitter (6) and input to the receiver (5), mainly via the receiving antenna 1 is modulated with interference waves by active elements provided in the receiver (5) to generate interference waves having the same frequency as the reception frequency frx.

11 Claims, 14 Drawing Sheets

L7

C9

WIRELESS COMMUNICATION DEVICE

This application is the U.S. National phase of international application PCT/JP01/02800 filed on Mar. 30, 2001 which designates the U.S. PCT/JP01/02800 claims priority of JP Application No. 2000-94223 filed Mar. 30, 2002.

TECHNICAL FIELD

The present invention relates to a wireless communication apparatus such as a cellular phone, automobile phone and the like, for use in a wireless communication system.

BACKGROUND ART

A conventional wireless communication apparatus such as a cellular phone, automobile phone and the like, for use in a wireless communication system includes a receiving antenna 1 connected to a receiver 5 and a transmitting antenna 11 connected to a transmitter 6, as shown in FIG. 25.

In the thus configured wireless communication apparatus, the reception signal is received via antenna 1 and input to receiver 5 while a transmission signal is output from transmitter 6 and radiated externally from antenna 11.

Generally, in most cases, the receiving antenna and transmitting antenna are integrated into one structure (designated at 1 in FIG. 26) and the signal transmission path is branched by a duplexer (DUP) 4 into two paths toward receiver 5 and toward a transmitter 6, as shown in FIG. 26. As another typical configuration, an active antenna changer switch 3 may be used to perform switching between an external antenna terminal 7 and antenna 1, as shown in FIG. 27.

In a conventional wireless communication apparatus having the configuration as shown in FIG. 25, when an interference signal corresponding to $\Delta f = |frx \pm ftx|$ is input to antenna 1 where the reception frequency is represented as frx and transmission frequency is represented as ftx, jamming waves having a frequency equal to the reception frequency frx are generated by modulation between transmission frequency ftx and interference frequency $\Delta f$, in the active elements included in receiver 5 or transmitter 6. Therefore, the wireless communication apparatus has suffered the problem of its reception characteristics being deteriorated by the jamming waves.

In a conventional wireless communication apparatus having a configuration shown in FIG. 26, the level of the signal of transmission frequency ftx entering from transmitter 6 to receiver 5 is markedly high, so that the level of interference frequency $\Delta f$ becomes further increased. As a result, the wireless communication apparatus has suffered the problem of its reception characteristics being further degraded.

When an external antenna is used, an antenna changer switch is used as disclosed in Japanese Patent Application Laid-open Hei 6 No. 37668. In the conventional wireless communication apparatus employing an active antenna changer switch 3 as the antenna changer switch as shown in FIG. 27, modulation between transmission frequency ftx and interference frequency $\Delta f$ produces jamming waves having a frequency equal to the reception frequency frx. Accordingly, the wireless communication apparatus has suffered the problem of its reception characteristics being deteriorated by the jamming waves.

The present invention has been proposed in view of the above problems, it is therefore an object of the present invention to provide a wireless communication apparatus which performs communication using the reception and transmission frequencies, simultaneously, wherein degradation of its reception characteristics due to interference signals is prevented.

DISCLOSURE OF INVENTION

In order to achieve the above object, the wireless communication apparatus of the present invention has the following features.

In accordance with a wireless communication apparatus of the present invention, a wireless communication apparatus which establishes communication using reception and transmission frequencies simultaneously, is characterized in that an interference signal cutoff circuit for cutting interference signals having frequencies approximately equal to the absolute value of the sum or difference of the reception and transmission frequencies is interposed between the input terminal to a receiver and an antenna.

In accordance with a wireless communication apparatus of the present invention, a wireless communication apparatus which establishes communication using reception and transmission frequencies simultaneously, is characterized in that an interference signal cutoff circuit for cutting interference signals having a frequency equal to the transmission frequency is interposed between the input terminal to a receiver and an antenna.

In accordance with a wireless communication apparatus of the present invention, a wireless communication apparatus which establishes communication using reception and transmission frequencies simultaneously is characterized in that an interference signal cutoff circuit for cutting interference signals having frequencies approximately equal to the absolute value of the sum or difference of the reception and transmission frequencies is interposed between the input terminal to a transmitter and an antenna.

In accordance with a wireless communication apparatus of the present invention, a wireless communication apparatus which establishes communication using reception and transmission frequencies simultaneously and has a switch made up of active elements interposed between the input terminal to a receiver and an antenna, is characterized in that an interference signal cutoff circuit for cutting interference signals having frequencies approximately equal to the absolute value of the sum or difference of the reception and transmission frequencies is interposed between the switch and the antenna.

In accordance with a wireless communication apparatus of the present invention, a wireless communication apparatus which establishes communication using reception and transmission frequencies simultaneously and has a switch made up of active elements interposed between the input terminal to a receiver and an antenna is characterized in that an interference signal cutoff circuit for cutting interference signals having frequencies approximately equal to the absolute value of the sum or difference of the reception and transmission frequencies is interposed between the switch and the input terminal to the receiver.

In accordance with a wireless communication apparatus of the present invention, a wireless communication apparatus which establishes communication using reception and transmission frequencies simultaneously and has a switch made up of active elements interposed between the input terminal to a receiver and an antenna is characterized in that interference signal cutoff circuits for cutting interference signals having frequencies approximately equal to the absolute value of the sum or difference of the reception and transmission frequencies are interposed between the antenna and the switch and between the switch and the input terminal to the receiver.

In the above-described wireless communication apparatus of the present invention, the interference signal cutoff circuit may be composed of a trap circuit having a resonance frequency approximately equal to the absolute value of the sum or difference of the reception and transmission frequencies.

Also, in the above-described wireless communication apparatus of the present invention, the interference signal cutoff circuit may be composed of a bandpass filter having pass bands including the communication frequency and the transmission frequency and having an attenuation band around the frequency approximately equal to the absolute value of the sum or difference of the reception and transmission frequencies.

In accordance with a wireless communication apparatus of the present invention, a wireless communication apparatus which establishes communication using reception and transmission frequencies simultaneously and has a switch made up of active elements interposed between the input terminal to a receiver and an antenna is characterized in that an impedance adjusting circuit for adjusting the impedance to interference signals having frequencies approximately equal to the absolute value of the sum or difference of the reception and transmission frequencies is interposed between the switch and the input terminal to the receiver.

In the above-described wireless communication apparatus of the present invention, 2110 Hz to 2170 Hz can be used for the reception frequency and 1920 Hz to 1980 Hz can be used for the transmission frequency.

In accordance with a wireless communication apparatus of the present invention, a wireless communication apparatus which establishes communication using reception and transmission frequencies simultaneously is characterized in that a circuit presenting a low impedance to interference signals having frequencies approximately equal to the absolute value of the sum or difference of the reception and transmission frequencies is provided as a part of an antenna.

In accordance with a wireless communication apparatus of the present invention, a wireless communication apparatus which establishes communication using reception and transmission frequencies simultaneously, is characterized in that a circuit which presents high impedances at the reception frequency and the transmission frequency and which presents a low impedance to interference signals having frequencies approximately equal to the absolute value of the sum or difference of the reception and transmission frequencies is provided as a part of an antenna.

As has been described above, since the wireless communication apparatus of the present invention includes an interference signal cutoff circuit for cutting off interference signals which are originated from transmission reception frequencies when the reception and transmission frequencies are used simultaneously for communication, it is possible to improve the reception characteristics.

Further, use of a specifically set up trap circuit as the interference signal cutoff circuit makes it easy, and possible, to achieve large attenuation at frequencies at which cutoff is wanted.

Use of a specifically set up bandpass filter as the interference signal cutoff circuit prevents attenuation in the transmission and reception frequency bands.

Provision of an impedance adjusting circuit for adjusting the impedance to interference signals makes it possible to markedly reduce the power of received interference waves, hence improve the reception characteristics.

As has been described above, since the wireless communication apparatus of the present invention includes an interference signal cutoff circuit for cutting off interference signals which are originated from transmission reception frequencies when the reception and transmission frequencies are used simultaneously for communication, it is possible to improve the reception characteristics.

Further, use of a specifically set up trap circuit as the interference signal cutoff circuit makes it easy, and possible, to achieve large attenuation at frequencies at which cutoff is wanted.

Use of a specifically set up bandpass filter as the interference signal cutoff circuit prevents attenuation in the transmission and reception frequency bands.

Provision of an impedance adjusting circuit for adjusting the impedance to interference signals makes it possible to markedly reduce the power of received interference waves, hence improve the reception characteristics.

BEST MODE FOR CARRYING OUT THE INVENTION

Next, the embodiments of wireless communication apparatus of the present invention will be described with reference to the drawings.

<The First Embodiment>

Figure 1:
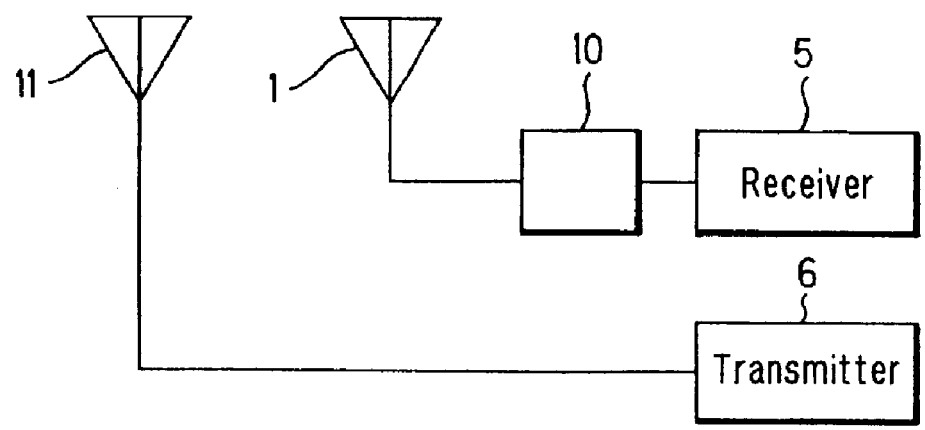
FIG. 1 is a block diagram showing a schematic configuration of a wireless communication apparatus in accordance with the first embodiment of the present invention.

FIG. 1 is a block diagram showing a schematic configuration of a wireless communication apparatus in accordance with the first embodiment of the present invention.

As shown in FIG. 1, the wireless communication apparatus according to the first embodiment of the present invention has an interference signal cutoff circuit 10 for cutting off electric waves having interference frequencies of $\Delta f=|frx \pm ftx|$ interposed between a receiving antenna 1 and a receiver 5. A transmitter 6 is connected to a transmitting antenna 11.

Unless a wireless communication apparatus is provided with this interference signal cutoff circuit 10, the transmission wave radiated from transmitter 6 and input to receiver 5, mainly via receiving antenna 1, and interference waves are modulated by active elements provided in receiver 5 to generate interference waves having the same frequency as the reception frequency frx, causing degradation of reception characteristics. In the wireless equipment of the first embodiment of the present invention, provision of interference signal cutoff circuit 10 makes it possible to prevent such degradation of reception characteristics.

[Interference Signal Cutoff Circuit]

Circuit examples of the above-described interference signal cutoff circuit 10 are shown in FIGS. 2 to 5.

To begin with, description will be made of the case where the interference frequency is in such relationship as $\Delta f=|frx-ftx|$.

Figure 2:
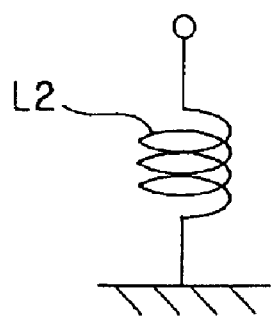
FIG. 2 is a circuit diagram showing an example of an interference signal cutoff circuit.

The interference signal cutoff circuit 10 shown in FIG. 2 is made up of an inductor L2 arranged in parallel with the main circuit. Since this interference signal cutoff circuit 10 presents a low impedance at the frequency $\Delta f$ and high impedances at the transmission frequency ftx and at the receiving frequency frx, interference waves of $\Delta f$ can be cut off.

Figure 3:
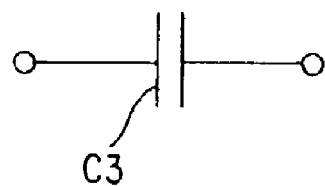
FIG. 3 is a circuit diagram showing an example of an interference signal cutoff circuit.

The interference signal cutoff circuit 10 shown in FIG. 3 is made up of a capacitor C3 arranged in series with the main circuit. Since this interference signal cutoff circuit 10 presents a high impedance at the frequency $\Delta f$ and low impedances at the transmission frequency ftx and at the receiving frequency frx, interference waves of $\Delta f$ can be cut off.

Next, description will be made of the case where the interference frequency is in such relationship as $\Delta f=|frx+ftx|$.

Figure 4:
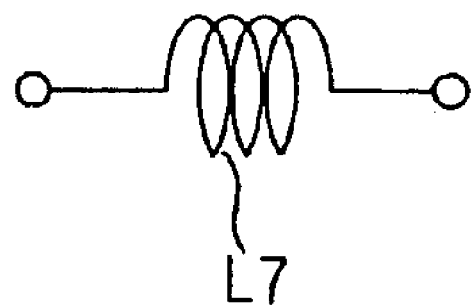
FIG. 4 is a circuit diagram showing an example of an interference signal cutoff circuit.

The interference signal cutoff circuit 10 shown in FIG. 4 is made up of an inductor L7 arranged in series with the main circuit. Since this interference signal cutoff circuit 10 presents a low impedance at the frequency $\Delta f$ and high impedances at the transmission frequency ftx and at the receiving frequency frx, interference waves of $\Delta f$ can be cut off.

Figure 5:
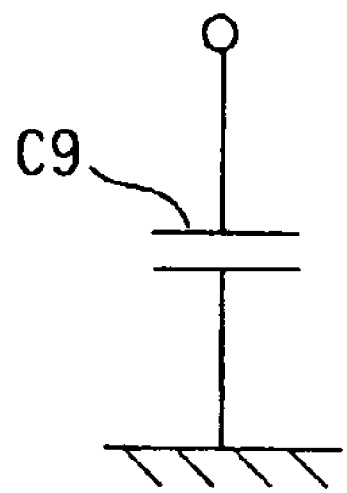
FIG. 5 is a circuit diagram showing an example of an interference signal cutoff circuit.

The interference signal cutoff circuit 10 shown in FIG. 5 is made up of a capacitor C9 arranged in parallel with the main circuit. Since this interference signal cutoff circuit 10 presents a high impedance at the frequency $\Delta f$ and low impedances at the transmission frequency ftx and at the receiving frequency frx, interference waves of $\Delta f$ can be cut off.

Figure 6:
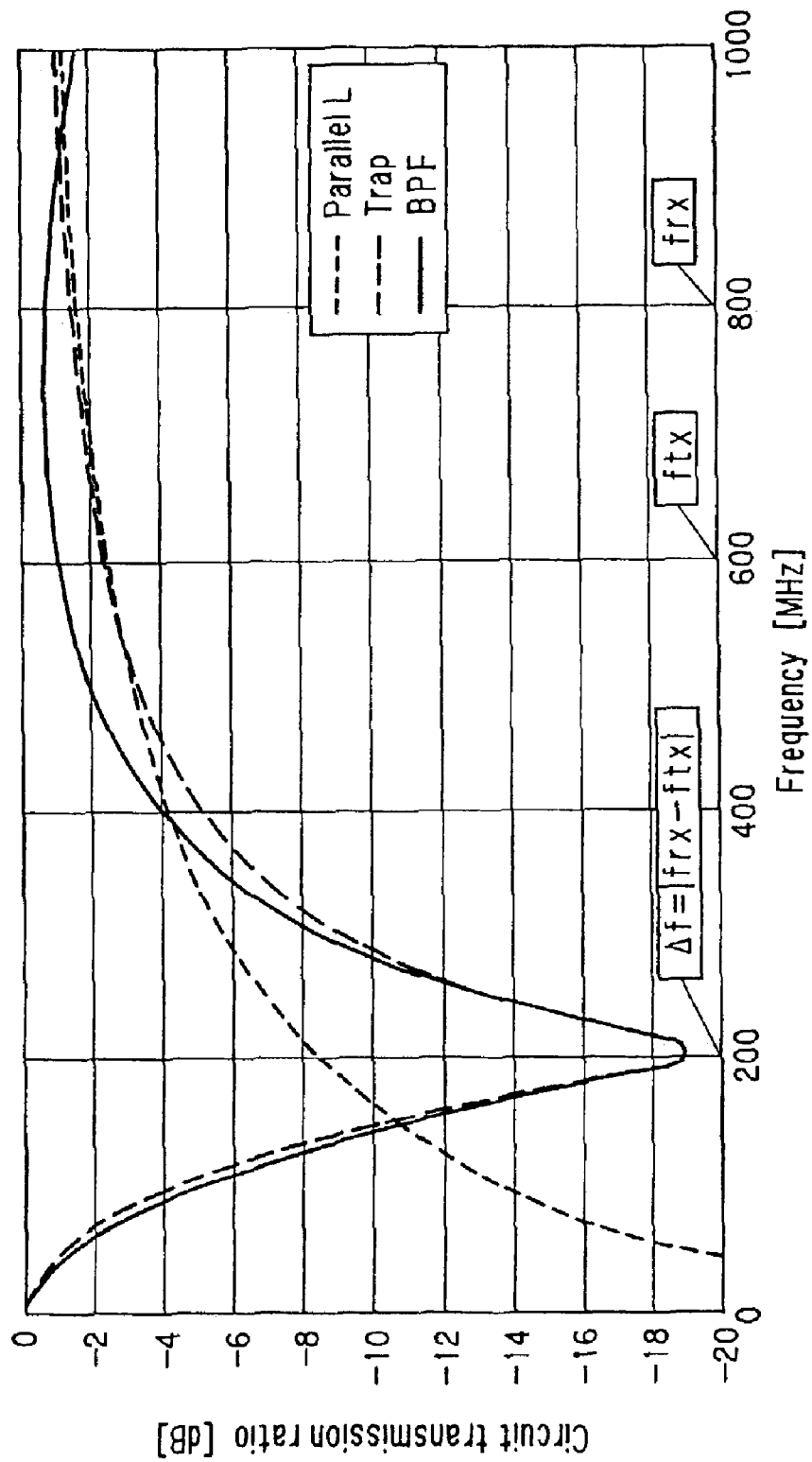
FIG. 6 is an illustrative chart showing the simulation result for verifying the characteristics of an interference signal cutoff circuit, trap circuit and bandpass filter used in a wireless communication apparatus according to the present invention.

FIG. 6 shows the simulation result for verifying the characteristics of an interference signal cutoff circuit 10 used in the wireless communication apparatus according to the first embodiment. In this simulation, the interference signal cutoff circuit 10 having the circuit configuration shown in FIG. 2 was used. In FIG. 6, 'Parallel L' indicated by the thin broken line represents the interference signal cutoff circuit 10 used in the wireless communication apparatus of the first embodiment.

Here, it is assumed that, for example, reception frequency frx=800 MHz, transmission frequency ftx=600 MHz and $\Delta f$=200 MHz. It is clearly understood from the simulation result shown in FIG. 6 that insertion of interference signal cutoff circuit 10 attenuates $\Delta f$ by about 8.5 dB. The loss in the pass band range is about 2.5 dB at ftx and about 1.7 dB at frx.

<The Second Embodiment>

Figure 7:
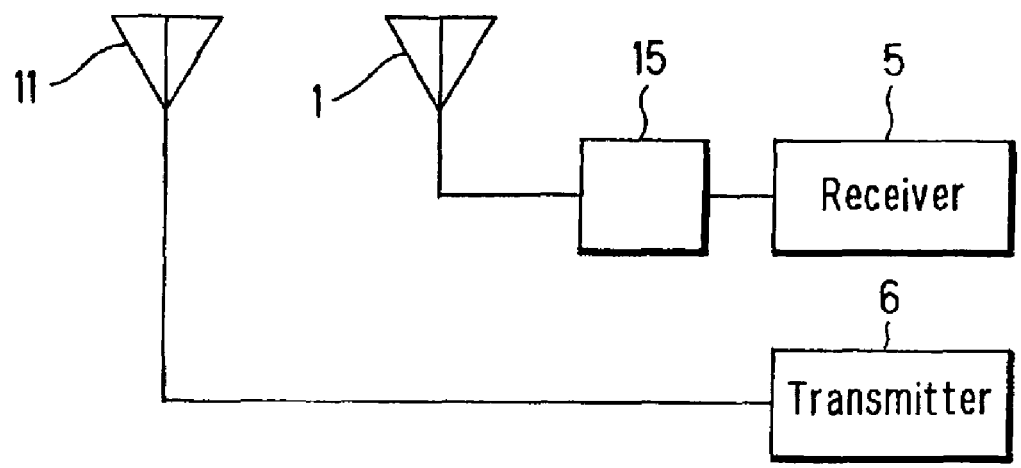
FIG. 7 is a block diagram showing a schematic configuration of a wireless communication apparatus in accordance with the second embodiment of the present invention.

FIG. 7 is a block diagram showing a schematic configuration of a wireless communication apparatus in accordance with the second embodiment of the present invention.

As shown in FIG. 7, the wireless communication apparatus according to the second embodiment of the present invention has an ftx cutoff circuit 15 for cutting off electric waves of a transmission frequency 'ftx' interposed between a receiving antenna 1 and a receiver 5. A transmitter 6 is connected to a transmitting antenna 11.

Unless a wireless communication apparatus is provided with this ftx cutoff circuit 15, the transmission wave radiated from transmitter 6 and input to receiver 5, mainly via receiving antenna 1, and the received waves are modulated by active elements provided in receiver 5 to generate interference waves having frequencies of $\Delta f=|frx \pm ftx|$. As a result, the reception characteristics degrades if $\Delta f$ is set as the intermediate frequency in reception. In the wireless equipment of the second embodiment of the present invention, provision of ftx cutoff circuit 15 makes it possible to prevent such degradation of reception characteristics.

The ftx cutoff circuit 15 may use the same circuit configurations (see FIGS. 2 to 5) as the interference signal cutoff circuit 10 used in the wireless communication apparatus according to the first embodiment described above. In this case, the cutoff frequency should be set between frx and ftx.

<The Third Embodiment>

Figure 8:
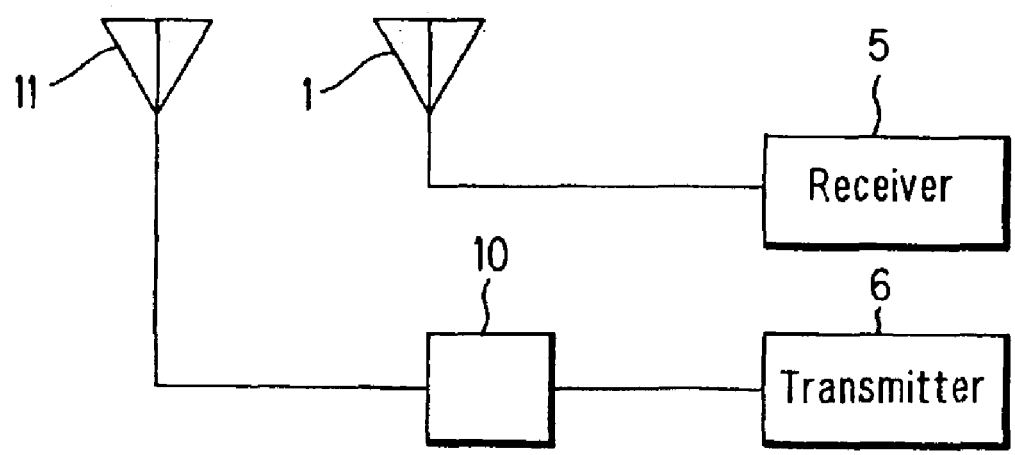
FIG. 8 is a block diagram showing a schematic configuration of a wireless communication apparatus in accordance with the third embodiment of the present invention.

FIG. 8 is a block diagram showing a schematic configuration of a wireless communication apparatus in accordance with the third embodiment of the present invention.

As shown in FIG. 8, the wireless communication apparatus according to the third embodiment of the present invention has an interference signal cutoff circuit 10 for cutting off electric waves having interference frequencies of $\Delta f=|frx \pm ftx|$ interposed between a receiving antenna 11 and a transmitter 6. A receiver 5 is connected to a receiving antenna 1.

Unless a wireless communication apparatus is provided with this interference signal cutoff circuit 10, interference waves and the transmission wave input to transmitter 6 are modulated by active elements provided in transmitter 6 to generate interference waves having the same frequency as the reception frequency frx. The generated electric waves are input to receiver 5, causing degradation of reception characteristics. In the wireless equipment of the third embodiment of the present invention, provision of interference signal cutoff circuit 10 makes it possible to prevent such degradation of reception characteristics.

The interference signal cutoff circuit 10 may use the same circuit configurations(see FIGS. 2 to 5) as the interference signal cutoff circuit 10 used in the wireless communication apparatus according to the first embodiment described above.

<The Fourth Embodiment>

Figure 9:
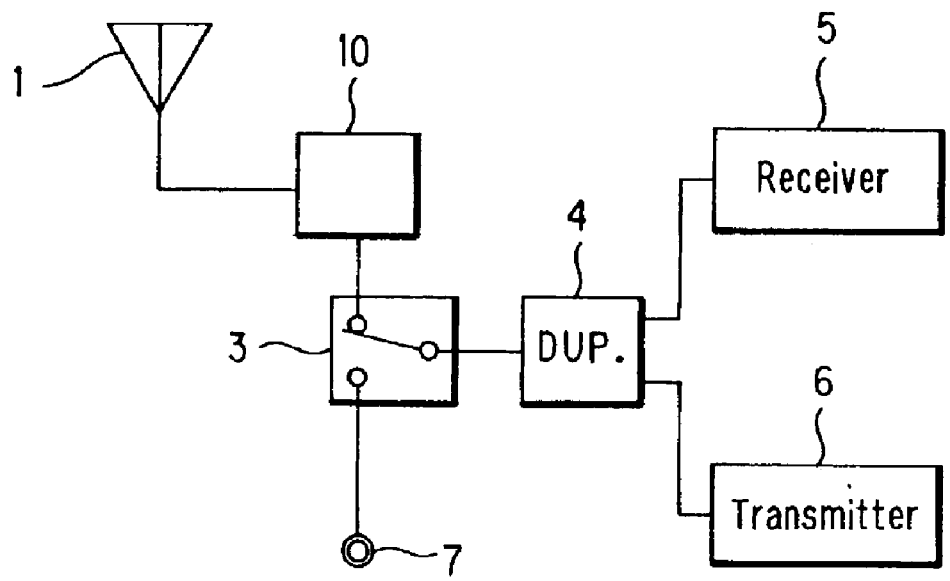
FIG. 9 is a block diagram showing a schematic configuration of a wireless communication apparatus in accordance with the fourth embodiment of the present invention.

FIG. 9 is a block diagram showing a schematic configuration of a wireless communication apparatus in accordance with the ninth embodiment of the present invention.

In the wireless communication apparatus according to the fourth embodiment of the present invention, the receiving antenna and transmitting antenna are integrated into one structure, as shown in FIG. 9, forming a transmitting and receiving antenna 1 and the signal transmission path is branched by a duplexer (DUP) 4 into two paths toward a receiver 5 and toward a transmitter 6. Further, an active antenna changer switch 3 for switching between antenna 1and an external antenna terminal 7 is interposed between antenna 1 and duplexer 4. An interference signal cutoff circuit 10 for cutting off electric waves having interference frequencies of $\Delta f=|frx \pm ftx|$ is interposed between antenna 1 and active antenna changer switch 3.

This active antenna changer switch 3 performs switching of the high frequency transmission/reception input/output signals from duplexer 4 between the signal path to interference signal cutoff circuit 10 and external antenna terminal 7.

Duplexer 4 outputs the high frequency reception output signal from active antenna changer switch 3 to receiver 5 and outputs the high frequency transmission input signal from transmitter 6 to active antenna changer switch 3.

Unless a wireless communication apparatus is provided with this interference signal cutoff circuit 10, the transmission wave and interference waves of interference frequencies $\Delta f$ are modulated in active antenna changer switch 3 to generate interference waves having the same frequency as the reception frequency frx, causing degradation of reception characteristics. In the wireless equipment of the fourth embodiment of the present invention, provision of interference signal cutoff circuit 10 makes it possible to prevent such degradation of reception characteristics.

The interference signal cutoff circuit 10 may use the same circuit configurations(see FIGS. 2 to 5) as the interference signal cutoff circuit 10 used in the wireless communication apparatus according to the first embodiment described above.

<The Fifth Embodiment>

Figure 10:
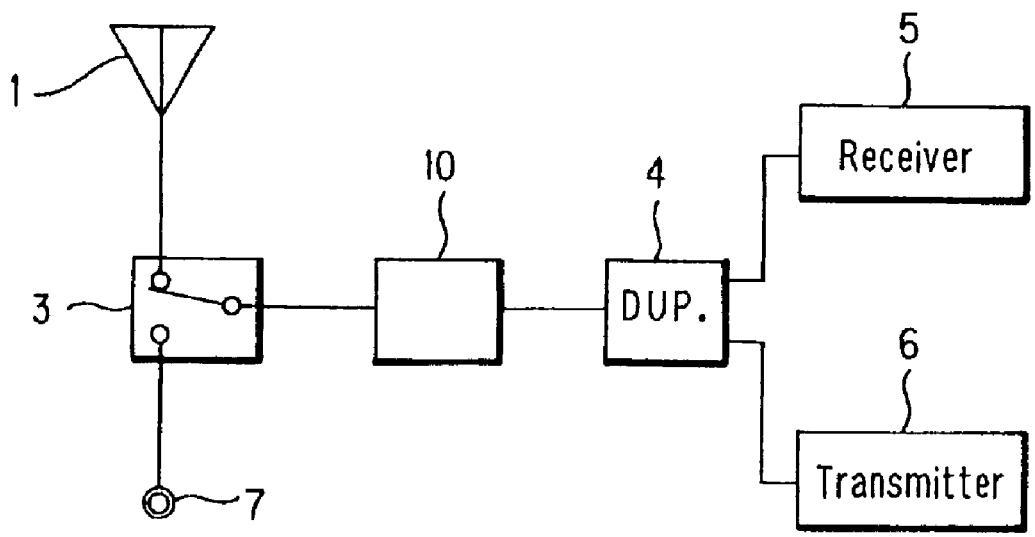
FIG. 10 is a block diagram showing a schematic configuration of a wireless communication apparatus in accordance with the fifth embodiment of the present invention.

FIG. 10 is a block diagram showing a schematic configuration of a wireless communication apparatus in accordance with the fifth embodiment of the present invention.

In the wireless communication apparatus according to the fifth embodiment of the present invention, the receiving antenna and transmitting antenna are integrated into one structure, as shown in FIG. 10, forming a transmitting and receiving antenna 1 and the signal transmission path is branched by a duplexer (DUP) 4 into two paths toward a receiver 5 and toward a transmitter 6. Further, an active antenna changer switch 3 for switching between an external antenna terminal 7 and antenna 1 is interposed between antenna 1 and duplexer 4. An interference signal cutoff circuit 10 for cutting off electric waves having interference frequencies of $\Delta f=|frx \pm ftx|$ is interposed between active antenna changer switch 3 and duplexer 4.

This active antenna changer switch 3 performs switching of the high frequency transmission/reception input/output signals from interference signal cutoff circuit 10 between the signal path to antenna 1 and external antenna terminal 7.

Duplexer 4 outputs the high frequency reception output signal from interference signal cutoff circuit 10 to receiver 5 and outputs the high frequency transmission input signal from transmitter 6 to interference signal cutoff circuit 10.

Unless a wireless communication apparatus is provided with this interference signal cutoff circuit 10, part of the waves of interference frequencies $\Delta f$ and the transmission wave are modulated in active elements provided in receiver 5 to generate interference waves having the same frequency as the reception frequency frx, causing degradation of reception characteristics. In the wireless equipment of the fifth embodiment of the present invention, provision of interference signal cutoff circuit 10 makes it possible to prevent such degradation of reception characteristics.

The interference signal cutoff circuit 10 may use the same circuit configurations(see FIGS. 2 to 5) as the interference signal cutoff circuit 10 used in the wireless communication apparatus according to the first embodiment described above.

<The Sixth Embodiment>

Figure 11:
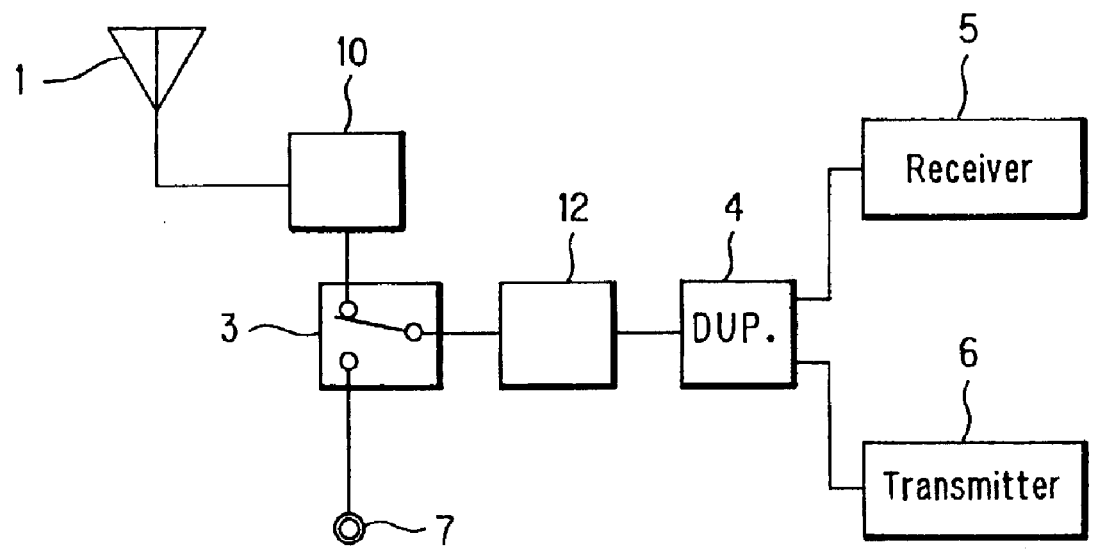
FIG. 11 is a block diagram showing a schematic configuration of a wireless communication apparatus in accordance with the sixth embodiment of the present invention.

FIG. 11 is a block diagram showing a schematic configuration of a wireless communication apparatus in accordance with the sixth embodiment of the present invention.

In the wireless communication apparatus according to the sixth embodiment of the present invention, the receiving antenna and transmitting antenna are integrated into one structure, as shown in FIG. 11, forming a transmitting and receiving antenna 1 and the signal transmission path is branched by a duplexer (DUP) 4 into two paths toward a receiver 5 and toward a transmitter 6. Further, an active antenna changer switch 3 for switching between an external antenna terminal 7 and antenna 1 is interposed between antenna 1 and duplexer 4. Interference signal cutoff circuits 10 and 12 for cutting off electric waves having interference frequencies of $\Delta f=|frx \pm ftx|$ are interposed between antenna 1 and active antenna changer switch 3 and between active antenna changer switch 3 and duplexer 4, respectively.

This active antenna changer switch 3 performs switching of the high frequency transmission/reception input/output signals from interference signal cutoff circuit 12 between the signal path to interference signal cutoff circuit 10 and external antenna terminal 7.

Duplexer 4 outputs the high frequency reception output signal from interference signal cutoff circuit 12 to receiver 5 and outputs the high frequency transmission input signal from transmitter 6 to interference signal cutoff circuit 12.

Unless a wireless communication apparatus is provided with these interference signal cutoff circuits 10 and 12, the transmission wave and interference waves of interference frequencies Δf are modulated in active antenna changer switch 3 to generate interference waves having the same frequency as the reception frequency frx, causing degradation of reception characteristics. In the wireless equipment of the sixth embodiment of the present invention, provision of interference signal cutoff circuits 10 and 12 makes it possible to prevent such degradation of reception characteristics.

The interference signal cutoff circuits 10 and 12 may use the same circuit configurations(see FIGS. 2 to 5) as the interference signal cutoff circuit 10 used in the wireless communication apparatus according to the first embodiment described above.

<The Seventh Embodiment>

As has been described heretofore, according to the wireless communication apparatus according to the first to sixth embodiments, it is possible to prevent degradation of reception characteristics by cutting off interference waves.

However, in the wireless communication apparatus according to the first to sixth embodiments described above, there are cases where sufficient amounts of attenuation cannot be obtained at frequencies at which cutoff is wanted. Therefore, the wireless equipment according to the seventh embodiment of the present invention is designed so that frequencies at which cutoff is wanted can be attenuated intensively, in a simple manner.

Figure 12:
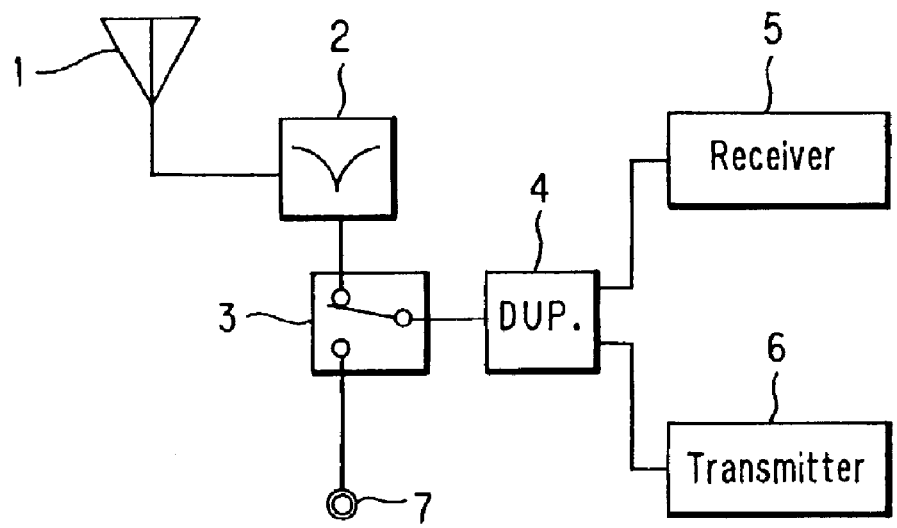
FIG. 12 is a block diagram showing a schematic configuration of a wireless communication apparatus in accordance with the seventh embodiment of the present invention.

FIG. 12 is a block diagram showing a schematic configuration of a wireless communication apparatus according to the seventh embodiment of the present invention.

In the wireless communication apparatus according to the seventh embodiment of the present invention, the receiving antenna and transmitting antenna are integrated into one structure, as shown in FIG. 12, forming a transmitting and receiving antenna 1 and the signal transmission path is branched by a duplexer (DUP) 4 into two paths toward a receiver 5 and toward a transmitter 6. Further, an active antenna changer switch 3 for switching between an external antenna terminal 7 and antenna 1 is interposed between antenna 1 and duplexer 4. A trap circuit 2 for cutting off electric waves having interference frequencies of Δf=|frx±ftx| is interposed between antenna 1 and active antenna changer switch 3.

This active antenna changer switch 3 performs switching of the high frequency transmission/reception input/output signals from duplexer 4 between the signal path to trap circuit 2 and external antenna terminal 7.

Further, duplexer 4 outputs the high frequency reception output signal from active antenna changer switch 3 to receiver 5 and outputs the high frequency transmission input signal from transmitter 6 to active antenna changer switch 3.

Unless a wireless communication apparatus is provided with this trap circuit 2, the transmission wave and interference waves of interference frequencies Δf are modulated in active antenna changer switch 3 to generate interference waves having the same frequency as the reception frequency frx, causing degradation of reception characteristics. In the wireless equipment of the seventh embodiment of the present invention, provision of trap circuit 2 makes it possible to intensively cut off signals of interference waves of desired frequencies Δf, hence prevent degradation of reception characteristics in an efficient manner.

[Trap Circuit]

Figure 13:
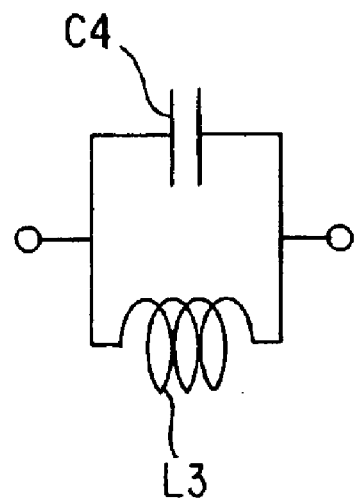
FIG. 13 is a circuit diagram showing an example of a trap circuit.
Figure 14:
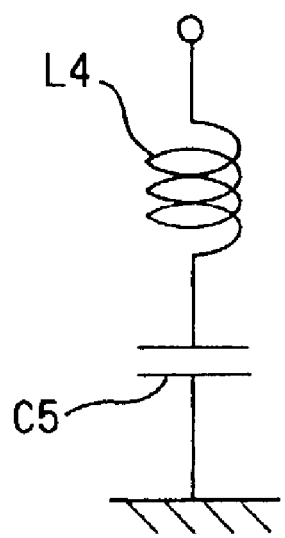
FIG. 14 is a circuit diagram showing an example of a trap circuit.

FIGS. 13 and 14 show circuit examples of the above-mentioned trap circuit 2.

The trap circuit 2 shown in FIG. 13 is made up of a capacitor C4 and an inductor L3 arranged in parallel and is interposed in series in the main circuit. The capacitor C4 and inductor L3 of this trap circuit 2 cause resonance at the cutoff frequency so as to intensively cut off interference waves around this frequency band.

The trap circuit 2 shown in FIG. 14 is made up of a capacitor C5 and an inductor L4 arranged in series and is inserted in parallel with the main circuit. The capacitor C5 and inductor L4 of this trap circuit 2 cause resonance at the cutoff frequency so as to intensively cut off interference waves around this frequency band.

The characteristics of trap circuit 2 used in the wireless communication apparatus according to the seventh embodiment will be examined based on the simulation result shown in FIG. 6 already described.

In FIG. 6, 'Trap' indicated by the broken line represents the trap circuit 2 used in the wireless communication apparatus of the seventh embodiment.

Here, it is assumed that, for example, reception frequency frx=800 MHz, transmission frequency ftx=600 MHz and Δf=200 MHz. It is clearly understood from the simulation result shown in FIG. 6 that insertion of trap circuit 2 attenuates Δf by about 19 dB and that improved cutoff characteristics are obtained compared to the wireless communication apparatus according to the first to sixth embodiments described heretofore. In this case, the loss in the pass band range is about 2.5 dB at ftx and about 1.5 dB at frx.

<The Eighth Embodiment>

As described above, according to the wireless communication apparatus according to the seventh embodiment, it is possible to achieve large attenuation at a frequency at which cutoff is wanted.

However, in the wireless communication apparatus according to the seventh embodiment described above, there is a concern that more than a little attenuation might occur in the transmission/reception frequency ranges. Therefore, the wireless communication apparatus according to the eighth embodiment of the present invention is configured so that no attenuation will occur in the transmission/reception frequency ranges.

Figure 15:
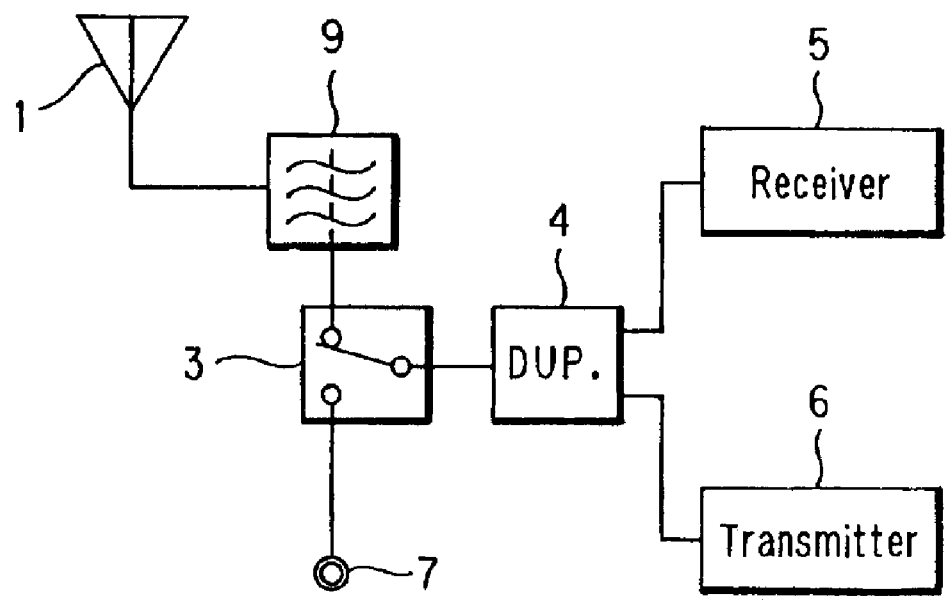
FIG. 15 is a block diagram showing a schematic configuration of a wireless communication apparatus in accordance with the eighth embodiment of the present invention.

FIG. 15 is a block diagram showing a schematic configuration of a wireless communication apparatus according to the eighth embodiment of the present invention.

In the wireless communication apparatus according to the eighth embodiment of the present invention, the receiving antenna and transmitting antenna are integrated into one structure, as shown in FIG. 15, forming a transmitting and receiving antenna 1 and the signal transmission path is branched by a duplexer (DUP) 4 into two paths toward a receiver 5 and toward a transmitter 6. Further, an active antenna changer switch 3 for switching between an external antenna terminal 7 and antenna 1 is interposed between antenna 1 and duplexer 4. A bandpass filter 9 for cutting off electric waves having interference frequencies of Δf=|frx±ftx| is interposed between antenna 1 and active antenna changer switch 3.

This active antenna changer switch 3 performs switching of the high frequency transmission/reception input/output signals from duplexer 4 between the signal path to bandpass filter 9 and external antenna terminal 7.

Duplexer 4 outputs the high frequency reception output signal from active antenna changer switch 3 to receiver 5 and outputs the high frequency transmission input signal from transmitter 6 to active antenna changer switch 3.

Bandpass filter 9 is designed so that it makes transmission frequency ftx and reception frequency frx with minimum losses and that it cuts off electromagnetic waves at interference frequencies of Δf=|frx±ftx|.

Unless a wireless communication apparatus is provided with this bandpass filter 9, the transmission wave and interference waves of interference frequencies Δf are modulated in active antenna changer switch 3 to generate interference waves having the same frequency as the reception frequency frx, causing degradation of reception characteristics. In the wireless equipment of the eighth embodiment of the present invention, provision of bandpass filter 9 makes it possible to prevent such degradation of reception characteristics. Further, since transmission losses therethrough at the reception frequency frx and at the transmission frequency ftx are markedly small, degradation of reception characteristics can be prevented further efficiently.

[Bandpass Filter]

Figure 16:
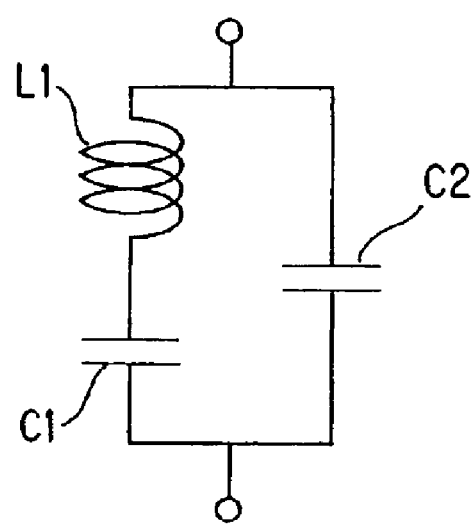
FIG. 16 is a circuit diagram showing an example of a bandpass filter.

As a circuit example of the aforementioned bandpass filter 9, the circuit configuration of a bandpass filter 9 used for Δf=|frx−ftx| is shown in FIG. 16.

The bandpass filter 9 shown in FIG. 16 is composed of an inductor L1, a capacitor C1 and a capacitor C2. Inductor L1 and capacitor C1 are adapted to cause series resonance at around Δf while inductor L1 and capacitor C2 are adapted to cause parallel resonance at around frx and ftx. The capacitance of capacitor C1 and capacitor C2 are set so that capacitor C1>capacitor C2, capacitor C2 presents a high impedance at around Δf and capacitor C1 presents low impedances at around frx and ftx.

Thus, arrangement of bandpass filter 9 in parallel with the main circuit provides a function similar to the way the aforementioned trap circuit 2 functions, at around Δf and permits frequencies at around frx and ftx to pass therethrough with markedly minimized loss.

Figure 17:
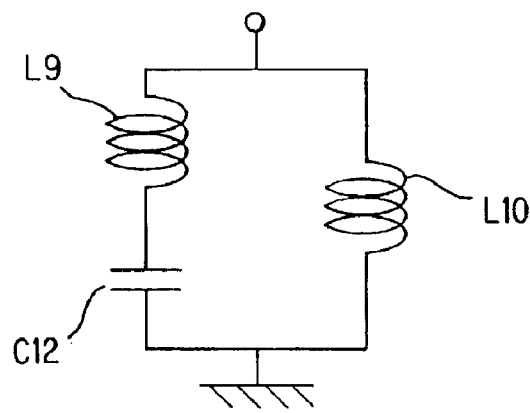
FIG. 17 is a circuit diagram showing an example of a bandpass filter.

Next, as a circuit example of the bandpass filter 9, a circuit configuration of a bandpass filter 9 used for Δf=|frx+ftx| is shown in FIG. 17.

The bandpass filter 9 shown in FIG. 17 is composed of inductors L9 and L10 and a capacitor C12. Inductor L9 and capacitor C12 are adapted to cause series resonance at around Δf while inductor L10 and capacitor C12 are adapted to cause parallel resonance at around frx and ftx. The inductance of inductor L9 and inductor L10 are set so that inductor L10>inductor L9, inductor L10 presents a high impedance at around Δf and inductor L10 presents low impedances at around frx and ftx.

Thus, arrangement of bandpass filter 9 in parallel with the main circuit provides a function similar to the way the aforementioned trap circuit 2 functions, at around Δf and permits frequencies at around frx and ftx to pass therethrough with markedly minimized loss.

Based on the simulation result shown in FIG. 6 already referred to, the characteristics of the bandpass filter 9 used in the wireless communication apparatus according to the eighth embodiment will be examined.

In FIG. 6, 'Trap' indicated by the solid line represents the bandpass filter 9 used in the wireless communication apparatus of the eighth embodiment.

Here, it is assumed that, for example, reception frequency frx=800 MHz, transmission frequency ftx=600 MHz and Δf=200 MHz. It is clearly understood from the simulation result shown in FIG. 6 that insertion of bandpass filter 9 attenuates Δf by about 19 dB. In this case, the loss in the pass band range is about 1.0 dB at ftx and about 0.8 dB at frx, which means that the characteristics of transmission are improved compared to the above wireless communication apparatus according to the seventh embodiment.

Figure 18:
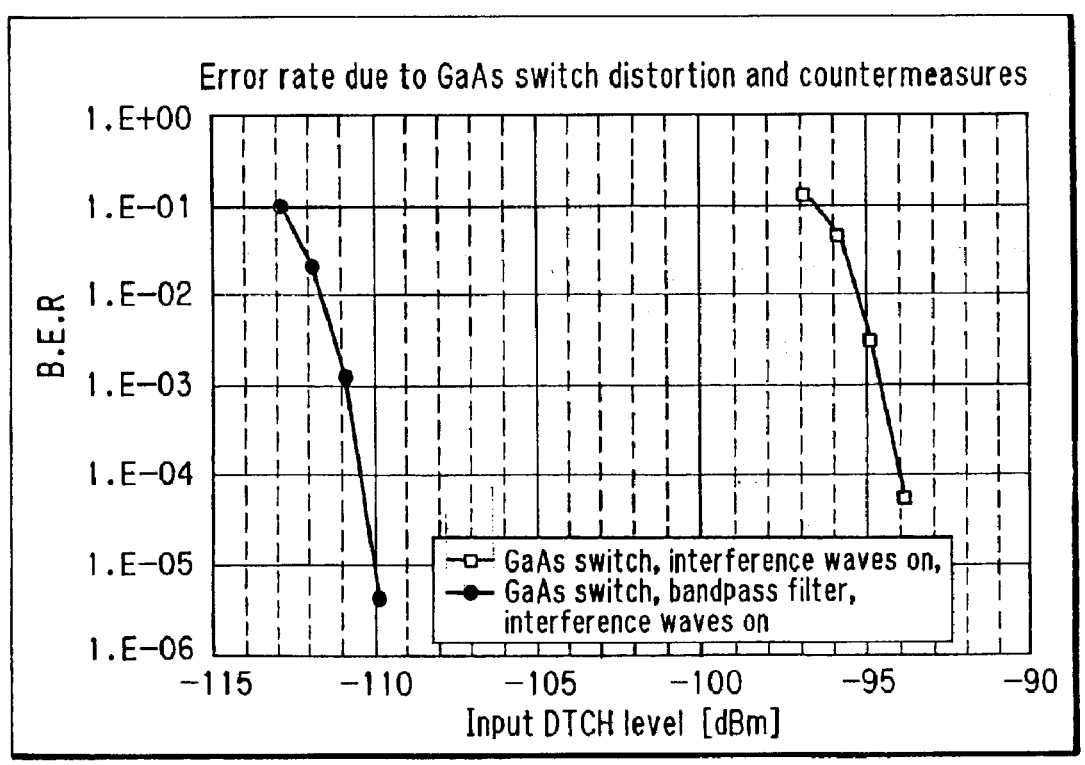
FIG. 18 is a chart for illustrating an experimental result of improvement in error rate for verifying the effect of the wireless communication in accordance with the eighth embodiment of the present invention.

FIG. 18 is a chart for illustrating an experimental result of improvement in error rate for verifying the effect of the wireless communication in accordance with the eighth embodiment of the present invention.

It is clearly understood from FIG. 18 that use of bandpass filter 9 will improve the error rate by about 15 dB in terms of input level compared to the case where no bandpass filter 9 is used.

<The Ninth Embodiment>

Figure 19:
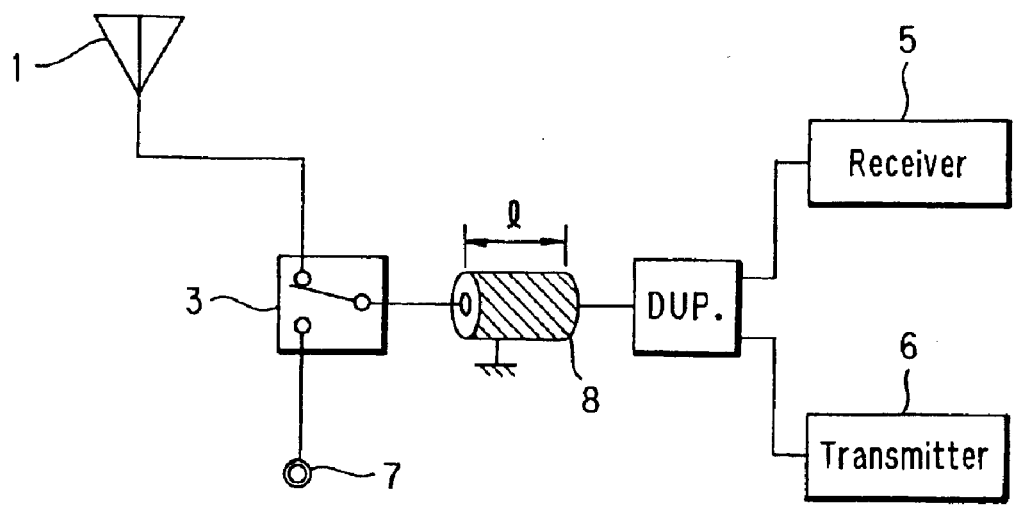
FIG. 19 is a block diagram showing a schematic configuration of a wireless communication apparatus in accordance with the ninth embodiment of the present invention.

FIG. 19 is a block diagram showing a schematic configuration of a wireless communication apparatus in accordance with the ninth embodiment of the present invention.

In the wireless communication apparatus according to the ninth embodiment of the present invention, the receiving antenna and transmitting antenna are integrated into one structure, as shown in FIG. 19, forming a transmitting and receiving antenna 1 and the signal transmission path is branched by a duplexer (DUP) 4 into two paths toward a receiver 5 and toward a transmitter 6. Further, an active antenna changer switch 3 for switching between an external antenna terminal 7 and antenna 1 is interposed between antenna 1 and duplexer 4.

This active antenna changer switch 3 performs switching of the high frequency transmission/reception input/output signals from duplexer 4 between the signal path to antenna 1 and external antenna terminal 7.

Duplexer 4 outputs the high frequency reception output signal from active antenna changer switch 3 to receiver 5 and outputs the high frequency transmission input signal from transmitter 6 to active antenna changer switch 3.

Further, the length l of the transmission path, designated at 8, between active antenna changer switch 3 and duplexer 4, may be adjusted so as to reduce the amount of infiltration of electric waves of interference frequencies of Δf=|frx±ftx| at the input terminal of receiver 5.

Figure 20:
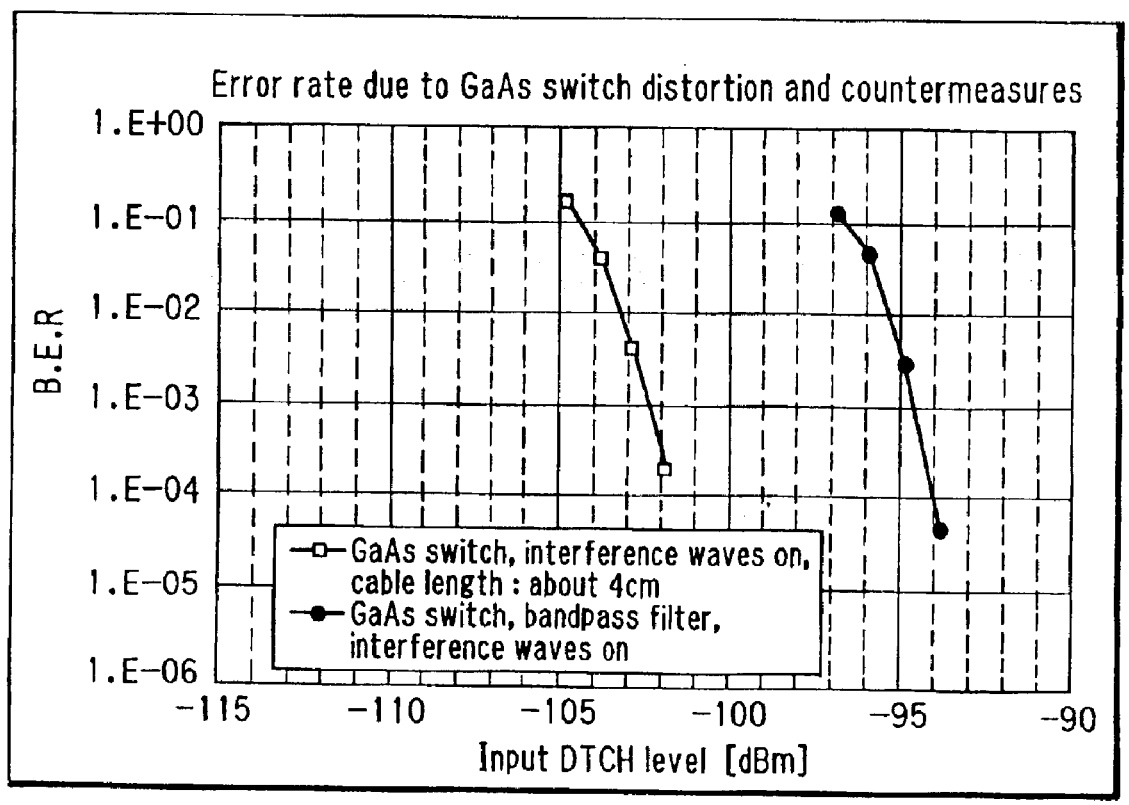
FIG. 20 is a chart for illustrating an experimental result of improvement in error rate for verifying the effect of the wireless communication in accordance with the ninth embodiment of the present invention.

FIG. 20 is a chart for illustrating an experimental result of improvement in error rate for verifying the effect of the wireless communication in accordance with the ninth embodiment of the present invention.

It is clearly understood from FIG. 20 that adjustment to the length of transmission path 8 will improve the error rate by about 8 dB in terms of input level compared to the case where no adjustment is made to the length of transmission path 8.

<The Tenth Embodiment>

Figure 21:
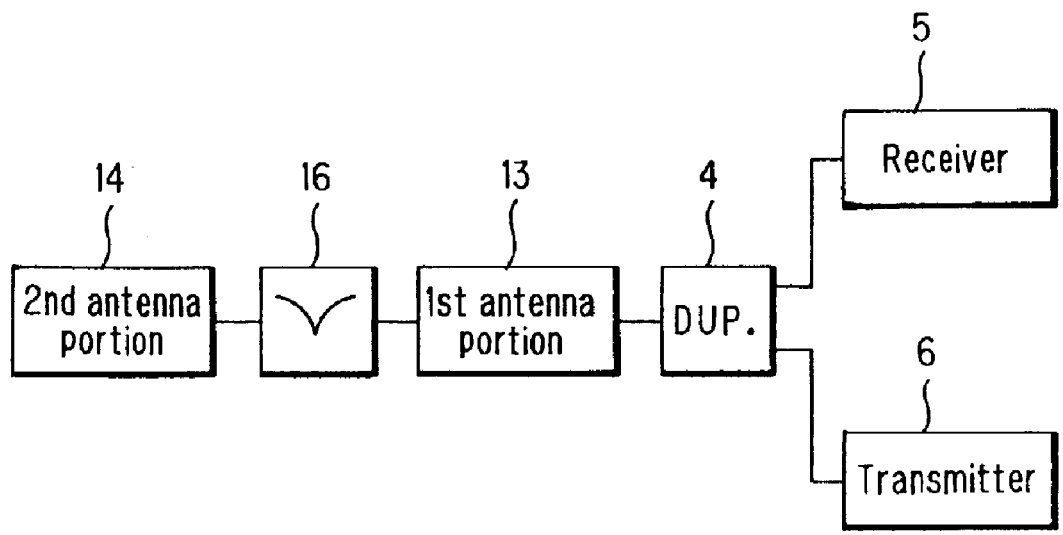
FIG. 21 is a block diagram showing a schematic configuration of a wireless communication apparatus in accordance with the first embodiment 0 of the present invention.

FIG. 21 is a block diagram showing a schematic configuration of a wireless communication apparatus in accordance with the tenth embodiment of the present invention.

The wireless communication apparatus according to the tenth embodiment of the present invention includes a first antenna portion 13 and a second antenna portion 14, and the signal transmission path is branched by a duplexer (DUP) 4 into two paths toward a receiver 5 and toward a transmitter 6, as shown in FIG. 21. Further, a trap circuit 16 is interposed between first antenna portion 13 and second antenna portion 14.

This duplexer 4 outputs the high frequency reception output signal from first antenna portion 13 to receiver 5 and outputs the high frequency transmission input signal from transmitter 6 to first antenna portion 13.

First antenna portion 13 and second antenna portion 14 are adapted to operate as one antenna structure. Here, second antenna portion 14 may be omitted.

Trap circuit 16 is set so as to present a low impedance to electric waves of interference frequency of Δf=|frx−ftx|. When the wavelength of the electric waves of Δf is compared to the wavelengths of electric waves frx and ftx, the wavelength of the electric waves of Δf is obviously long. Therefore, the entire antenna, which is manufactured for frx and ftx, presents a low impedance at the frequency of Δf, so the gain of the antenna becomes markedly small. As a result, the power of received interference waves becomes markedly low.

[Trap Circuit]

Figure 22:
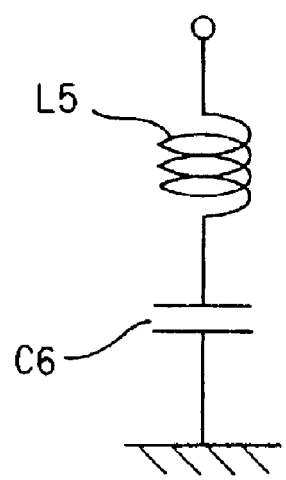
FIG. 22 is a circuit diagram showing an example of a trap circuit.

FIG. 22 shows a circuit example of the aforementioned trap circuit 16.

The trap circuit 16 shown in FIG. 22 is made up of a capacitor C6 and an inductor L5 arranged in series and inserted in parallel with the main circuit. In this trap circuit 16, inductor L5 and capacitor C6 cause series resonance, presenting zero impedance at the interference frequency of Δf. Accordingly, the antenna will not receive any waves at the interference frequency of Δf.

<The Eleventh Embodiment>

As described above, according to the wireless communication apparatus of the tenth embodiment, the power of the received interference waves can be weakened so as to prevent degradation of reception characteristics.

However, in some cases with the wireless communication apparatus according to the above tenth embodiment, provision of trap circuit 16 may change the antenna characteristics of transmission/reception frequencies, causing difficulties in antenna designing.

With the wireless equipment according to the tenth embodiment of the present invention, if the antenna characteristics of transmission/reception frequencies can be made unchanged, antenna designing can be simplified.

Figure 23:
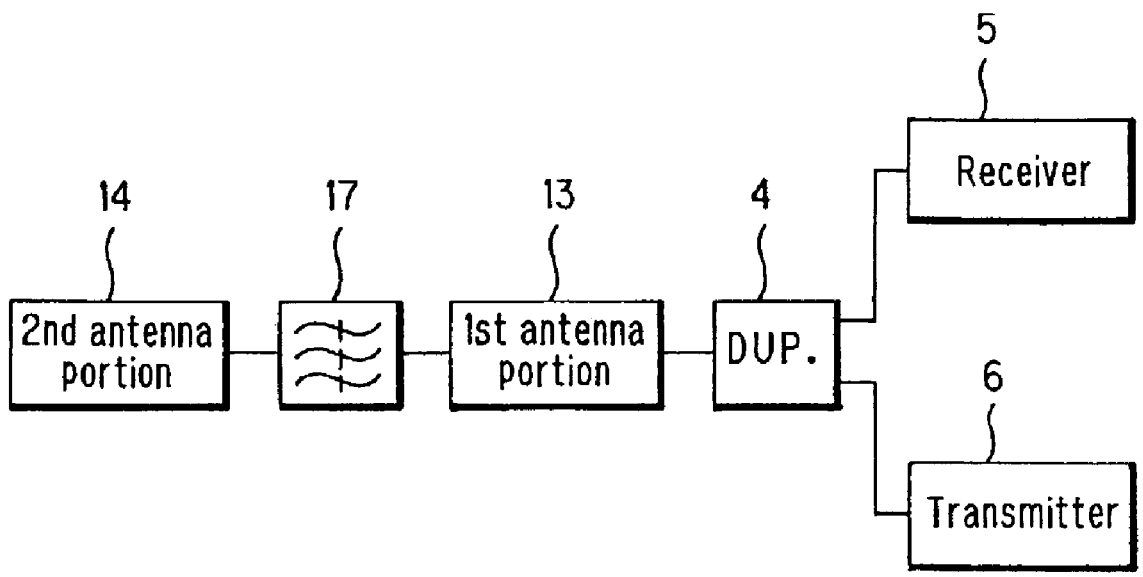
FIG. 23 is a block diagram showing a schematic configuration of a wireless communication apparatus in accordance with the first embodiment 1 of the present invention.

FIG. 23 is a block diagram showing a schematic configuration of a wireless communication apparatus in accordance with the eleventh embodiment of the present invention.

The wireless communication apparatus according to the eleventh embodiment of the present invention includes a first antenna portion 13 and a second antenna portion 14, and the signal transmission path is branched by a duplexer (DUP) 4 into two paths toward a receiver 5 and toward a transmitter 6, as shown in FIG. 23. Further, a bandpass filter 17 is interposed between first antenna portion 13 and second antenna portion 14.

This duplexer 4 outputs the high frequency reception output signal from first antenna portion 13 to receiver 5 and outputs the high frequency transmission input signal from transmitter 6 to first antenna portion 13.

First antenna portion 13 and second antenna portion 14 are adapted to operate as one antenna structure. Here, second antenna portion 14 may be omitted.

Bandpass filter 17 is set so as to present high impedances at the transmission frequency ftx and at the reception frequency frx and present a low impedance to electric waves of interference frequency of Δf=|frx−ftx|. Thus, the impedance of bandpass filter 17 is high at the transmission frequency ftx and at the reception frequency frx, so that the antenna characteristics can be kept unchanged.

[Bandpass Filter]

Figure 24:
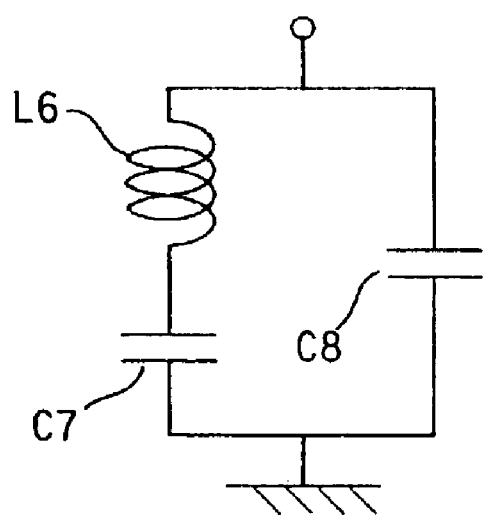
FIG. 24 is a circuit diagram showing an example of a bandpass filter.
Figure 25:
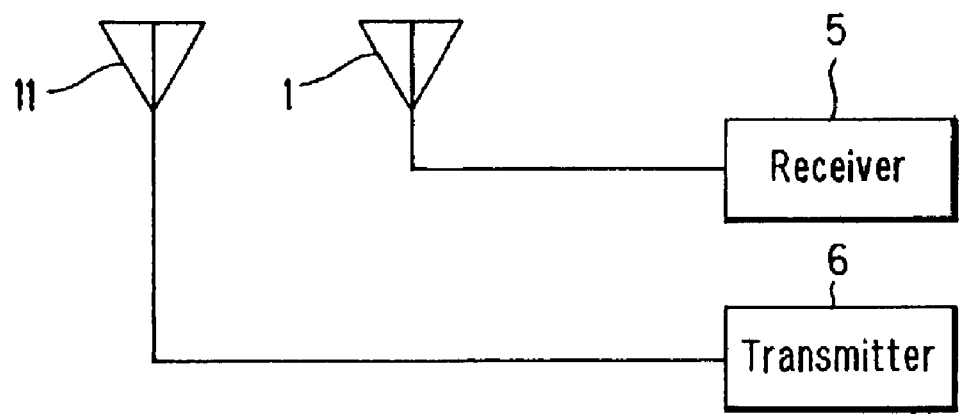
FIG. 25 is a block diagram showing a schematic configuration of a conventional wireless communication apparatus.
Figure 26:
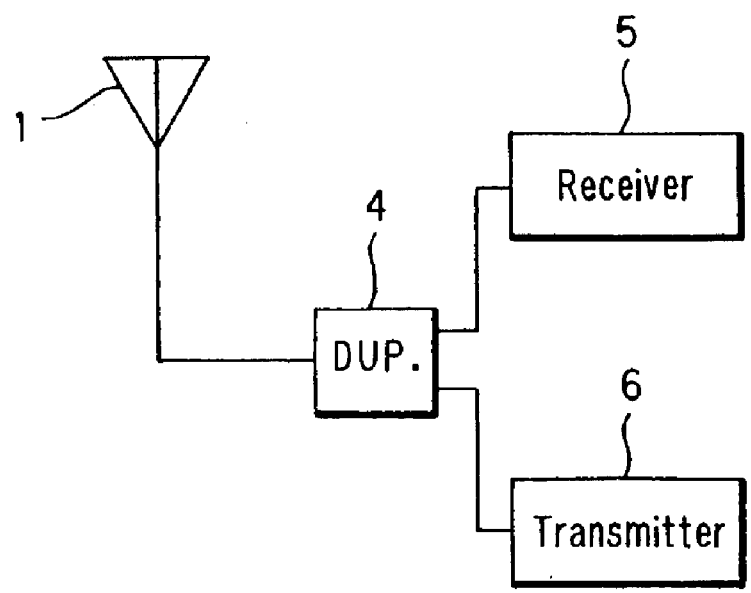
FIG. 26 is a block diagram showing a schematic configuration of a conventional wireless communication apparatus with a common antenna shared for transmission and reception.
Figure 27:
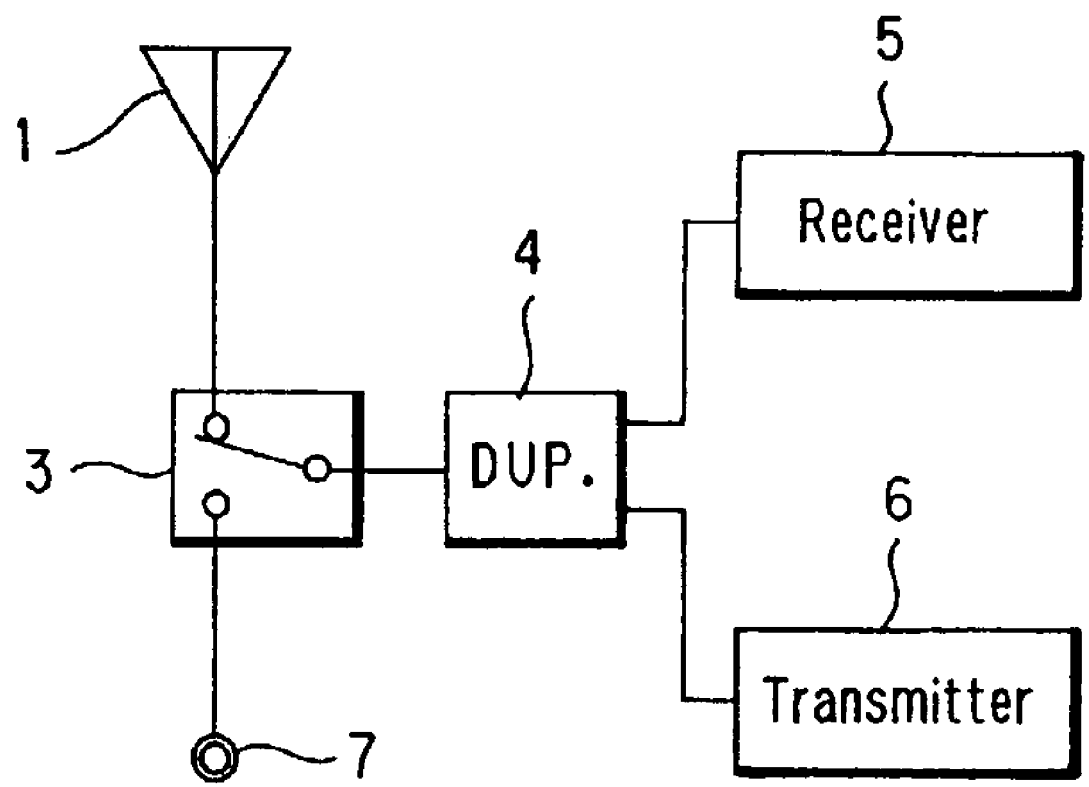
FIG. 27 is a block diagram showing a schematic configuration of a conventional wireless communication apparatus including an active antenna changer switch.

FIG. 24 shows a circuit example of the aforementioned bandpass filter 17.

The bandpass filter 17 shown in FIG. 24 is composed of an inductor L6, a capacitor C7 and a capacitor C8. Inductor L6 and capacitor C7 are adapted to cause series resonance so as to present zero impedance at the interference frequency Δf.

Accordingly, the antenna will not receive any waves at the interference frequency of Δf. The capacitance of capacitor C7 is set to be much greater than that of capacitor C8, so that the impedance of capacitor C7 becomes low at the transmission frequency ftx and at the reception frequency frx. Inductor L6 and capacitor C8 are adapted to cause parallel resonance at the transmission frequency ftx and the reception frequency frx, so the impedance becomes infinitely large.

If the thus specified-band filter 17 is attached as a part of the antenna, it is not perceived as a load by the antenna, so that there will be no influence on the antenna characteristics.

The wireless communication apparatus according to the present invention described heretofore can exhibit maximum realization in improvement of the reception characteristics especially when it is applied to IMT2000 (International Mobile Telecommunication 2000) where the reception frequency band is set from 2110 to 2170 MHz and the transmission frequency band is set from 1920 to 1980 MHz. Illustratively, the differential frequency when the above transmission/reception frequency bands are designated is 190 MHz. Since the television frequency band exists in the 190 MHz band, there has been a concern of high power interference waves occurring. The wireless communication apparatus of the present invention will not be affected by such interference waves and can be improved in reception characteristics.

INDUSTRIAL APPLICABILITY

As has been described heretofore, the wireless communication apparatus of the present invention is useful for wireless communication systems such as cellular phones, automobile phones and the like, and in particular, is suitable for cutting of interference signals which arise and are dependent on the transmission frequency and reception frequency when the reception frequency and the transmission frequency are used simultaneously for communications.

What is claimed is:

1. A wireless communication apparatus which establishes communication using reception and transmission frequencies simultaneously, characterized in that an interference signal cutoff circuit for cutting interference signals having frequencies approximately equal to the absolute value of the sum or difference of the reception and transmission frequencies is interposed between the input terminal to a receiver and an antenna.

2. A wireless communication apparatus which establishes communication using reception and transmission frequencies simultaneously characterized in that an interference signal cutoff circuit for cutting interference signals having frequencies approximately equal to the absolute value of the sum or difference of the reception and transmission frequencies is interposed between the input terminals to a transmitter and a receiver and an antenna.

3. A wireless communication apparatus which establishes communication using reception and transmission frequencies simultaneously and has a switch made up of active elements interposed between the input terminal to a receiver and an antenna, characterized in that an interference signal cutoff circuit for cutting interference signals having frequencies approximately equal to the absolute value of the sum or difference of the reception and transmission frequencies is interposed between the switch and the antenna.

4. A wireless communication apparatus which establishes communication using reception and transmission frequencies simultaneously and has a switch made up of active elements interposed between the input terminal to a receiver and an antenna, characterized in that an interference signal cutoff circuit for cutting interference signals having frequencies approximately equal to the absolute value of the sum or difference of the reception and transmission frequencies is interposed between the switch and the input terminal to the receiver.

5. A wireless communication apparatus which establishes communication using reception and transmission frequencies simultaneously and has a switch made up of active elements interposed between the input terminal to a receiver and an antenna, characterized in that interference signal cutoff circuits for cutting interference signals having frequencies approximately equal to the absolute value of the sum or difference of the reception and transmission frequencies are interposed between the antenna and the switch and between the switch and the input terminal to the receiver.

6. The wireless communication apparatus according to any one of claims 1, 2 and 3 to 5, wherein the interference signal cutoff circuit is composed of a trap circuit having a resonance frequency approximately equal to the absolute value of the sum or difference of the reception and transmission frequencies.

7. The wireless communication apparatus according to any one of claims 1, 2 and 3 to 5, wherein the interference signal cutoff circuit is composed of a bandpass filter having pass bands including the communication frequency and the transmission frequency and having an attenuation band around the frequency approximately equal to the absolute value of the sum or difference of the reception and transmission frequencies.

8. A wireless communication apparatus which establishes communication using reception and transmission frequencies simultaneously and has a switch made up of active elements interposed between the input terminal to a receiver and an antenna, characterized in that an impedance adjusting circuit for adjusting the impedance to interference signals having frequencies approximately equal to the absolute value of the sum or difference of the reception and transmission frequencies is interposed between the switch and the input terminal to the receiver.

9. A wireless communication apparatus which establishes communication using reception and transmission frequencies simultaneously, characterized in that a circuit presenting a low impedance to interference signals having frequencies approximately equal to the absolute value of the sum or difference of the reception and transmission frequencies is provided as a part of an antenna.

10. A wireless communication apparatus which establishes communication using reception and transmission frequencies simultaneously, characterized in that a circuit which presents high impedances at the reception frequency and the transmission frequency and which presents a low impedance to interference signals having frequencies approximately equal to the absolute value of the sum or difference of the reception and transmission frequencies is provided as a part of an antenna.

11. The wireless communication apparatus according to any one of claims 1, 2 and 3 to 5, wherein the reception frequency falls within the range from 2110 Hz to 2170 Hz and the transmission frequency falls within the range from 1920 Hz to 1980 Hz.

* * * * *